US011169997B1

(12) United States Patent
Debo et al.

(10) Patent No.: US 11,169,997 B1
(45) Date of Patent: Nov. 9, 2021

(54) CENTRALIZED DATA ACCESS TOOL IMPLEMENTING RESOURCE GOVERNANCE

(71) Applicant: STATE FARM MUTUAL AUTOMOBILE INSURANCE COMPANY, Bloomington, IL (US)

(72) Inventors: Gregory James Debo, Normal, IL (US); Richard J. Simon, Bloomington, IL (US); Larry Koenen, Bloomington, IL (US); Adam Jelinek, Bloomington, IL (US); Vaidya Balasubramanian Pillai, Springfield, IL (US); Richard Berglund, Bloomington, IL (US); Jerry Burger, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 834 days.

(21) Appl. No.: 14/816,327

(22) Filed: Aug. 3, 2015

Related U.S. Application Data

(60) Provisional application No. 62/043,136, filed on Aug. 28, 2014.

(51) Int. Cl.
*G06F 16/2455* (2019.01)
*G06F 16/2453* (2019.01)

(52) U.S. Cl.
CPC .. *G06F 16/24553* (2019.01); *G06F 16/24534* (2019.01)

(58) Field of Classification Search
None
See application file for complete search history.

(56) References Cited

U.S. PATENT DOCUMENTS

| 8,645,425 B1* | 2/2014 | Brown | G06F 16/217 707/788 |
|---|---|---|---|
| 9,374,243 B1* | 6/2016 | Certain | H04L 15/16 |
| 9,413,680 B1* | 8/2016 | Kusters | H04L 12/1403 |
| 2006/0045089 A1* | 3/2006 | Bacher | H04L 12/4641 370/392 |
| 2008/0222734 A1* | 9/2008 | Redlich | G06F 21/577 726/26 |
| 2010/0125565 A1* | 5/2010 | Burger | G06F 17/30433 707/713 |

(Continued)

*Primary Examiner* — Amresh Singh
(74) *Attorney, Agent, or Firm* — Marshall, Gerstein & Borun LLP

(57) ABSTRACT

Methods, systems, apparatus, and non-transitory media are described for governing resources used to execute and retrieve database entries in accordance with an ad-hoc structured query language (SQL) script. Various aspects are described to determine whether a written SQL script is optimized, to execute the SQL script if it is optimized, and to otherwise reject unoptimized SQL scripts. The resources used during the execution of the SQL script may further be monitored to control resource use, and the execution of SQL scripts may be ceased if a processor-based resource limit threshold is exceeded. The SQL script execution system may be implemented in a wide variety of systems, such as database servers. The scripts may be executed in conjunction with scrubbing and encryption scripts to protect sensitive data, and thus the SQL scripts may be received via one or more public APIs.

24 Claims, 5 Drawing Sheets

(56) References Cited

U.S. PATENT DOCUMENTS

2010/0306846 A1\* 12/2010 Alperovitch ........ H04L 63/1408
    726/23
2014/0304294 A1\* 10/2014 Sharma ............. G06F 17/30457
    707/769

\* cited by examiner

All Queries   My Results   Submit Query   Hide Help            User: Mike Smith     [Admin Add Query]

ALL QUERIES

All queries you are authorized to run are listed below.
Select a title to view or run that query. If you do not see the query you are looking for, please contact your account administrator.

Entry keyword to limit query list

2. To filter the queries you can type any word that appears in the name, description, sql id, or the query itself.

1. First, select a group below to produce the initial list of queries.

[ Select Here ▶ ]

3. To select a query, place the cursor over the query and click to go to the next screen.

| Name of Query | SQL ID | Status | Description of Query |
|---|---|---|---|

*FIG. 2A*

All Queries   My Results   Submit Query   Show Help            User: Mike Smith        [Admin Add Query]

CDAT Query By Creator
Search by alias

Note: Asterisk (*) indicates a required field.

```
SELECT * FROM RU99.QRY WHERE CRETR_EML_ALIAS_CD = :INPUT_ALIAS_CHAR;
```

:INPUT_ALIAS_CHAR  xxxxxxx

Status: ACTIVE

*Environment:  PRODPLEX ▶

*Reason for Query:  Service Incident ▶

Build Query                                                   Admin Update Query

FIG. 2B

CENTRALIZED DATA ACCESS TOOL IMPLEMENTING RESOURCE GOVERNANCE

CROSS REFERENCE TO RELATED APPLICATIONS

This application claims the benefit of U.S. Provisional Patent Application No. 62/043,136, entitled "Centralized Data Access Tool Implementing Resource Governance," filed Aug. 28, 2014, the disclosure of which is hereby expressly incorporated by reference herein in its entirety.

TECHNICAL FIELD

The present disclosure generally relates to database management systems implementing structured query language (SQL) script execution and, more particularly, to controlling the governance of resources in database management systems performing SQL script execution.

BACKGROUND

Insurance databases often contain information that needs to be readily accessed by insurer employees. Typically, an employee may query an insurer database by writing or by selecting a pre-written structured query language (SQL) script. A database management device, such as a server, for example, may receive SQL scripts and execute commands, such as database queries, in accordance with the parameters defined by the respective SQL script. Once the SQL script is executed, a corresponding data query may be made, and data may be retrieved by the server and then provided to the employee.

However, these servers usually perform several functions in addition to executing SQL scripts, such as web-hosting and data infrastructure support, for example. As a result, if a server spends excessive processing resources executing incoming SQL scripts, then the server may crash or slow to the point of providing an unacceptable quality of service for supported customer-facing applications. Further, if the applications hosted by the server go offline, the insurer may suffer considerable monetary losses (e.g., on the order of $800,000 per hour of downtime) due to customer applications being unavailable. But the data retrieved by the server upon execution of a relevant SQL script also provides insurer employees with data necessary for quotes and other vital day-to-day functions, and as a result, the execution of SQL scripts remains an important server function. Therefore, implementing servers that support both SQL script execution and reliable hosting of other important customer-facing applications presents several challenges.

BRIEF SUMMARY

In some aspects, a computer-implemented method, an apparatus, and a non-transitory, tangible computer-readable medium are provided for retrieving data from one or more insurer databases. These aspects may include (1) receiving an ad-hoc structured query language (SQL) script; (2) executing the ad-hoc SQL script to retrieve data from the one or more insurer databases; (3) determining whether a processor-based resource limit threshold is exceeded during execution of the ad-hoc SQL script; (4) ceasing execution of the ad-hoc SQL script upon the processor-based resource limit threshold being reached during execution of the ad-hoc SQL script; and (5) retrieving data from the one or more insurer databases in accordance with the ad-hoc SQL script when the processor-based resource limit is not reached. The aspects may include first determining whether the ad-hoc SQL script is optimized to retrieve data from the one or more insurer databases upon execution of the ad-hoc SQL script, and only executing the ad-hoc SQL script only when it is determined that the ad-hoc SQL script is optimized.

When the ad-hoc SQL script is used to retrieve confidential data, aspects may include scrubbing a portion of the confidential data retrieved from the one or more databases such that the entirety of the confidential data is not retrieved. Additionally, the ad-hoc SQL script may be received via a public application programming interface (API). Aspects include the computer-implemented method being performed by a database server and/or the one or more databases being part of a federation server.

The processor-based resource limit threshold may be a maximum time period based upon a maximum number of machine cycles transpiring during execution of the ad-hoc SQL script, and the determination of whether the maximum time period has been exceeded may be based upon (1) a database from among the one or more databases that is accessed upon execution of the ad-hoc SQL script; and (2) a time of day when the ad-hoc SQL script is received.

The ad-hoc SQL script may be one ad-hoc SQP script from among a plurality of ad-hoc SQL scripts. In such a case, aspects described may also include subsequently receiving another ad-hoc SQL script after receiving a plurality of ad-hoc SQL scripts, and retrieving data previously retrieved from the one or more databases corresponding to a previously executed ad-hoc SQL script without a processor needing to execute the subsequently received ad-hoc SQL script. Additionally, when additional SQL scripts are received, aspects may include an audit trail being stored in one or more of the databases that may include one or more of (1) each of the plurality of ad-hoc SQL scripts; (2) data retrieved from the one or more databases for each of the plurality of ad-hoc SQL scripts that was executed; (3) the processor-based resource limit threshold for each of the plurality of ad-hoc SQL scripts that was ceased and thus not executed; (4) an identification of an employee from whom each of the plurality of ad-hoc SQL scripts was received; (5) a database from among the one or more databases that was accessed for each of the plurality of ad-hoc SQL scripts that was executed; and (6) a time that each of the plurality of ad-hoc SQL scripts was received.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present aspects are not limited to the precise arrangements and instrumentalities shown, wherein:

FIG. 2A is an exemplary screenshot 200 of a graphical interface used to write an SQL script;

FIG. 2B is an exemplary screenshot 250 of a graphical interface used to edit and send an SQL script;

Figure 1:
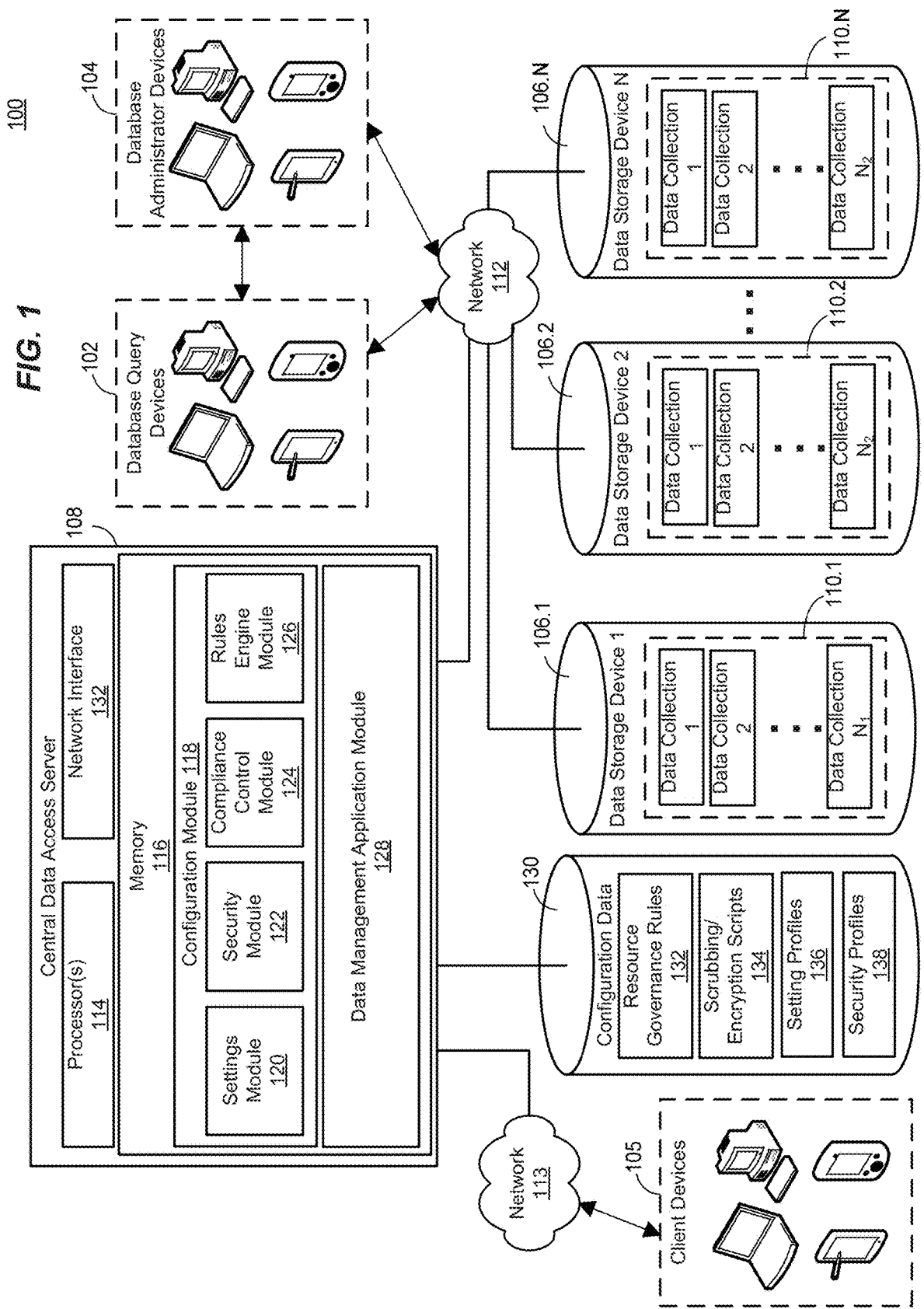
FIG. 1 is a block diagram of an exemplary computing environment 100 for governing resources in conjunction with SQL script execution.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments relate to, inter alia, data access governance and provide a Centralized Data Access Tool (CDAT) that protects a computer environment infrastructure from ad-hoc SQL (structured query language) queries. The Centralized Data Access Tool may (1) be a web-enabled application configured to allow administrators to manage, control, and run ad-hoc SQL queries; (2) execute via stored procedures; (3) create and manage an audit trail automatically; (4) save a query results history to eliminate the need to re-run queries; (5) group SQLs by application areas; (6) improve the stability or availability of a computer system or environment; (7) enforce SQL review and/or quality; and/or (8) provide for internal auditing.

The Centralized Data Access Tool may provide access to data in a controlled environment. For instance, the Tool may control (i) what data and applications that certain administrators may access, and/or (ii) what operations those administrators may perform. Access to specific information may only be provided with the proper security protocols or authentications being performed or satisfied by each individual administrator, and thus generic access to data may be removed or prevented, and compliance with security or other measures or requirements may be facilitated. The Tool may further govern what queries each administrator may run, and/or generate reports as to which administrators are accessing what data or databases.

The present embodiments may dynamically control resource limits based upon where and when the SQLs, which may be resource intensive, are running. As an example, a web-enabled system may be provided that mitigates the risks the un-optimized long running ad-hoc SQLs (SELECT, UPDATE, DELETE) pose by dynamically controlling the resource limits based upon where the users are running the SQLs and when they are running the SQLs. The system may be controlled using the configurable rules engine.

The present embodiments may provide functionality to access data and to automatically encrypt and/or scrub the NPI (non-public information), PCI (payment card industry), and/or other confidential data. For instance, a system and method may allow product administrators to configure the NPI, PCI and other confidential columns along with their encryption script and scrubbing script to protect the confidential data. The system and method may provide options (using APIs) for users to create their objects, load data and/or unload data, and/or invoke database services using the same framework.

The present embodiments may enable users to share their optimized SQLs with a community or team. The SQLs may be grouped by application area and stored in a searchable or other data base. The re-use of SQLs may eliminate the need for redundant work.

The present embodiments may allow users to automatically enforce data integrity during data corrections. Also, users may be allowed to integrate the Centralized Data Access Tool with the service management product for business case validation during data correction. This may be done to ensure that there is a valid and approved business case for correcting data. The before image and the after image may be stored in a database along with user information, session information, business case information, and other types of information.

The present embodiments may be configured to halt, limit and stop the ad-hoc SQL workloads whenever needed (such as based upon conversion time and peak hours). Also provided may be audit trail capability to meet internal auditing needs, as well as the ability to access data from operational analytic environments through federation or other servers based upon resource needs.

In one aspect, a computer-implemented method of intelligently controlling SQL load may be provided. The method may include dynamically controlling SQL load based upon (1) available computing resources and/or computer resource thresholds; (2) which SQLs are currently running and/or expected to run; (3) when, and on what resources, those SQLs are currently running and/or expected to run; (4) which SQLs are currently optimized; and/or (5) which SQLs have or are associated with (i) encrypted data, and/or (ii) confidential or personal information that has been or needs to be scrubbed. The method may further include sharing optimized SQLs, generating audit trails, and/or saving query results. The method may include additional, fewer, or alternate actions, including those discussed elsewhere herein.

Although database applications and data stored in databases are emphasized below in the context of infrastructure management for an insurance provider, some implementations of the systems and methods discussed herein may facilitate the automated governance of any number of software applications other than infrastructure management. For example, the techniques of the present disclosure may allow the governance of database processing resources related to software applications in the fields of ecommerce, billing, content management, information technology (IT), customer relationship management, marketing, analytics, project management, manufacturing, process control, procurement, social collaboration, data warehousing, facilities management, security, mobile applications, visualization, etc.

I. System Overview

FIG. 1 is a block diagram of an exemplary computing environment 100 for governing resources in conjunction with SQL script execution in accordance with one aspect of the disclosure. Computing environment 100 may include one or more database query devices 102, one or more database administrator devices 104, one or more client devices 105, N number of data storage devices 106.1-106.N, a configuration database 130, and a central data access server 108. Computing environment may include additional, fewer, or alternate components, including those discussed elsewhere herein.

In an aspect, central data access server 108 may manage, govern, or regulate any suitable number N of collections of data 110.1-110.N stored in each respective data storage device 106.1-106.N (e.g., in a distributed or otherwise segmented manner), which may include taking certain actions upon the collections of data 110.1-110.N in accordance with the execution of a received SQL script. The actions may include, for example, performing data queries and/or performing alterations on the collections of data 110.1-110.N.

Central data access server 108 may be implemented as a database server, and may execute one or more applications as part of a database management system. In various aspects, central data access server 108 may be disposed at a physical location different from the physical location of each of the data storage devices 106.1-106.N and/or configuration database 130. Further, each of the data storage devices 106.1-106.N and/or configuration database 130 may be disposed at the same or different locations than one another. For example, data storage devices 106.1-106.N may be disposed across a plurality of data centers located throughout the United States or throughout the world, while configuration database 130 may be located in the same building as central data access server 108.

In various aspects, central data governance server 108 may be configured to access (execute scripts on, query, alter data stored on, etc.) each of the data storage devices 106.1-106.N via a network 112. Further, central data governance server 108 may be configured to access (execute scripts on, query, alter data stored on, etc.) configuration database 130 via a direct connection or one or more network connections, which are not shown in FIG. 1 for purposes of brevity. Thus, central data access server 108 may facilitate the management, governance, and/or regulation of data storage devices 106.1-106.N from a central location (e.g., that of central data access server 108). Although a certain number N data storage devices 106 are illustrated in FIG. 1, those of ordinary skill in the relevant art(s) will appreciate that a computing environment for automated governance of databases or other software applications may include any suitable number of data storage devices 106, each storing any suitable number of data collections 110.

Data storage devices 106.1-106.N may be implemented as any suitable type of storage device configured to function as a database. For example, one or more of data storage devices 106.1-106.N may be implemented as a device utilizing optical storage disks, magnetic storage devices, and/or non-volatile memory devices, such as hard disk drives, for example, to facilitate data storage operations. In an aspect, data storage devices 106.1-106.N may store data redundantly across their respective data collections 110. For example, a portion of data stored at data location 1 on data storage device 106.1 may also be stored at one or more respective data locations on data storage device 106.2. In one aspect, data storage devices 106.1-106.N may be implemented as a standardized and/or commercially available off-the-shelf solution, such as one or more parts of a federation server, for example.

In various aspects, data storage devices 106.1-106.N and their respective collections of data 110.1-110.N may include data stored in any suitable data type of structure, format, protocol, language, etc. For example, the collections of data 110.1-110.N may include structured data, semi-structured data, or unstructured data stored in relational databases, object-relational databases, hierarchical databases, document-oriented databases, etc. Central data access server 108 may query, scan, or otherwise interact with the collections of data 110.1-110.N via languages, protocols, scripts, etc., as defined according to any suitable type and number of database servers, applications, and/or systems.

Examples of database applications that may be commercially available and implemented by central data access server 108 may include the DB2® Database Software, Apache™ Hadoop® Software Framework, SQL Server® Relational Database Management System, Oracle® Database Object-Relational Database Management System, MongoDB® Document-Oriented Database System, etc. Additionally, the collections of data 110.1-110.N may store any suitable type of data such as insurance claim/policy data, user interaction data, website analytics data, customer contact data, mobile application data, product or service data, etc.

Database query devices 102 may be configured to communicate with central data access server 108 via network 112 and/or to communicate with database administrator devices 104 via any suitable number of networks, wireless links, and/or wired links. Database query devices 102 may be implemented as any suitable mobile or stationary computing device. For example, database query devices 102 may be implemented as smartphones, tablet computers, laptop computers, desktop computers, personal digital assistants, smartwatches, head-mounted computing devices, wearable electronic devices, etc.

Database query devices 102 may be configured to send data queries to central data access server 108 and to retrieve data stored in one or more of data storage devices 106.1-106.N from central data access server 108. Database query devices 102 may implement any suitable number of user interfaces and/or input devices (e.g., touchscreens, displays, keyboards etc.) to facilitate this functionality.

In various aspects, the queries sent by database query devices 102 may be sent as a script conforming to any suitable computer programming language, such as Structure Query Language (SQL) scripts for example. Since the SQL query scripts are generated as needed, or "on the fly" by database query devices 102 and/or database administrator devices 104, these SQL scripts are typically referred to as "ad-hoc" SQL scripts. Throughout this disclosure, ad-hoc SQL scripts may be referred to either as ad-hoc SQL scripts or simply as SQL scripts for purposes of brevity.

In some aspects, database administrator devices 104 may first receive SQL query scripts from database query devices 102 and then send the SQL query scripts to central data access server 108 once reviewed, edited, and/or approved to provide an additional level of resource management control. Once central data access server 108 receives the SQL query script from database administrator devices 104, central data access server 108 in turn may retrieve data stored in one or more of data storage devices 106.1-106.N and send the retrieved data to database query devices 102.

Database query devices 102 may be configured to communicate with central data access server 108 in accordance with any suitable communications protocol. For example, database query devices 102 may be configured to communicate with network 112 via a Wireless Local Area Network (WLAN) protocol, which may be in turn converted to an Ethernet communications protocol between network 112 and central data access server 108.

In various aspects, database query devices 102 may be operated by individuals within a company who are tasked with the management of a variety of database applications, for example. To provide another example, database query devices 102 may be operated by individuals within a company who are tasked with accessing, modifying, and/or gathering data from one or more of data storage devices 106.1-106.N, which may be used for internal purposes such as report compilation, market research, data migration, etc.

Database administrator devices 104 may include devices substantially similar to those included in the database query devices 102; therefore, only differences between database query devices 102 and database administrator devices 104 will be further discussed. Operators of the database administrator devices 104 may include individuals responsible for administering, creating, manipulating, running code utilizing, or otherwise "touching" one or more of the collections of data stored on data storage devices 106.1-106.N. In other words, an operator of one of the database administrator devices 104 may include one or more individuals that are responsible for, or are primarily associated with, one of the collections of data 110.1-110.N.

As will be further discussed below, operators of database administrator devices 104 may communicate with central data access server 108 to create, update, and/or delete portions of one or more modules, applications, instructions, programs, algorithms, etc., that are executed by one or more processors implemented by central data access server 108. Database administrator devices 104 may also allow its respective operators (e.g., database administrators) to interact with central data access server 108 to perform various operations. For example, operators of database administrator devices 104 may create objects, load data onto and unload data from storage devices 106.1-106.N, configure data stored in data storage devices 106.1-106.N, etc. For example, an operator may configure one or more confidential columns associated with data stored in data storage devices 106.1-106.N by utilizing scrubbing and/or encryption scripts to protect the data.

Client devices 105 may include devices substantially similar to those included in the database query devices 102; therefore, only differences between database query devices 102 and client devices 105 will be further discussed. Operators of client devices 105 may include clients or customers of an insurance or other type of company. Customers operating client devices 105 may access central data access server 108 via network 113 to perform various operations. For example, a customer may access central data access server 108 via the Internet from a desktop computer to utilize a web-based application hosted by central data access server 108. As will be appreciated by those of ordinary skill in the relevant art(s), the functions provided by the web-based application hosted by central data access server 108 may depend upon the type of business operations and/or the relationship between the customer and the company. For example, for an insurance company, central data access server 108 may host a web-based application that collects data from customers in accordance with processing premium quotes, claim status requests, etc.

Networks 112 and/or 113 may include any appropriate combination of wired and/or wireless communication networks. For example, networks 112 and/or 113 may include any combination of a local area network (LAN), metropolitan area network (MAN), wide area network (WAN), public switched telephone networks (PSTN), etc., and may facilitate a connection to the Internet or other networks via any suitable number of wired or wireless links. For purposes of brevity, additional wired and/or wireless links are not shown in FIG. 1. To provide further examples, networks 112 and/or 113 may include wired telephone and cable hardware, satellite, cellular phone communication networks, etc.

In an aspect, network 112 may be implemented as a private network facilitating communications between employees of the company associated with central data access server 108, while network 113 may be implemented as a public network facilitating communications between client devices 105 and central data access server 108. For example, network 112 may be configured as an internal company local area network, or a collection of LANs, while network 113 may be configured to provide access to central data access server 108 by users outside the internal company LAN.

Although networks 112 and/or 113 are illustrated in FIG. 1 as single elements, those of ordinary skill in the relevant art(s) will appreciate that networks 112 and/or 113 may include a collection or aggregation of several networks, which may be the same or different types of wired and/or wireless networks. For example, as will be appreciated by those of ordinary skill in the relevant art(s), a connection to the Internet between central data access server 108 and network 113 may be facilitated by several firewalls, routers, domain name servers (DNS), sub-networks, wired links, wireless links, etc. To provide another example, a company LAN may include several aggregated wired networks communicating with one another across several network links. For brevity, any such suitable collection of network topologies may be illustrated in FIG. 1 as network 112 and/or network 113.

Central data governance server 108 may include a host processor 114, a network interface 132, and a memory 116, each of which may be configured to communicate with one another utilizing any suitable implementation or wired and/or wireless links, buses, etc.

Network interface 132 may include, for example, any suitable number of medium access control (MAC) units, physical layer (PHY) units, transceivers, etc., to facilitate communications between central data access server 108 and one or more other devices via network 112 and/or network 113, such as database query devices 102, database administrator devices 104, client device 105, etc.

In various embodiments, host processor 114 may send and receive communications in accordance with any suitable number of communication protocols via network interface 132. In accordance with such embodiments, host processor 114 may be configured to receive ad-hoc SQL scripts via network interface 132 that were sent from another device, such as database query devices 102, for example, via network 112. Host processor 114 may process the received ad-hoc SQL script and perform a corresponding action upon its execution. For example, if an SQL script is received via network interface 132 corresponding to a database query, then host processor 114 may execute the query SQL script to retrieve data in accordance with the SQL query script parameters. Host processor 114 may then communicate with network interface 132 to cause network interface 132 to send the data retrieved from one or more data storage devices 106.1-106.N, as a result of the executed SQL script, back to the querying device, such as database query devices 102, for example.

In various aspects, network interface 132 may communicate with one or more other devices using a suitable type and number of application programming interfaces (APIs). For example, network interface 132 may be configured to utilize a public API for communication between client devices 105 and central data access server 108, but a private API for communications between database query devices 102 and central data access server 108.

Host processor 114 may be configured to communicate with memory 116 to store to and read data from memory 116. In accordance with various embodiments, memory 116 may include a non-transitory, tangible computer-readable medium that may be implemented as any combination of volatile (e.g., a random access memory (RAM)), or a non-volatile memory (e.g., battery-backed RAM, FLASH, etc.). Memory 116 may be configured to store instructions executable on host processor 114. These instructions may include machine readable instructions that, when executed by host processor 114, cause host processor 114 to perform various acts.

Memory 116 may store one or more applications or modules. These applications or modules may include programs, instructions, algorithms, etc., that may be executed by host processor 114 to facilitate their respective functionality as described herein. For brevity, these applications, programs, instructions, algorithms, etc., are simply referred to as "modules" throughout his disclosure.

In another aspect, memory 116 may store a configuration module 118 and a data management application module 128. Memory 116 may also store a compliance control module 120, a security module 122, a settings module 124, and a rules engine module 126. Compliance control module 120, security module 122, settings module 124, and rules engine module 126 are portions of memory 116 on which configuration module 118 operates.

Although each of the modules are illustrated in FIG. 1 as separate modules stored in memory 116, various aspects include memory 116 storing any suitable number of modules to effectuate the functionality upon their respective execution as described herein. For example, as will be appreciated by those of ordinary skill in the relevant art(s), several modules may be combined together and stored in any suitable portion of memory 116. To provide another example, several modules may be stored across portions of more than one memory 116 that may be implemented by central data access server 108.

Settings module 122 may, when executed by host processor 114, configure, modify, or query one or more setting profiles 136 stored in configuration database 130. In an aspect, setting profiles 136 establish one or more application framework settings and/or parameters that are utilized by central data access server 108 at a given time. For example, setting profiles 136 may store user preferences, server information, information identifying a type of database management system (DBMS) implemented by central data access server 108, the capability to turn off one or more portions of central data access server 108, SQL workload limits, etc.

In an aspect, setting profiles 136 may indicate stored settings and/or user preferences corresponding to operators of a client device 105, database query device 102, and/or database administrator devices 104. Settings module 122 may query setting profiles 136 to retrieve the settings for a corresponding user when data is queried by a user. To provide another example, setting profiles 136 may include information such as a hardware type, software version, etc., implemented by central data access server 108. Settings module 122 may query setting profiles 136 to identify such information when requested by a user (e.g., database query device 102 operator). In this way, in aspects in which central database system 108 is implemented as a standardized off-the-shelf database management tool, operators may determine details about the manufacturer, protocol, etc., of the standardized implementation. To provide another example, setting profiles 136 may include information regarding processor-based resource limit thresholds and/or time schedules in which SQL commands may be limited and/or ignored to provide better resource management control, which will be further discussed below.

In various aspects, the information stored in setting profiles 136 may be uploaded from an operator, such as an administrator, for example, using one or more database administrator devices 104, for example. In this way, an administrator may establish the settings for central data access server 108 to best suit the particular needs of a company and change these settings as needed. For example, an administrator may update settings for central data access server 108 when new hardware is implemented, when existing hardware is upgraded when existing software is updated, etc.

Security module 122 may, when executed by host processor 114, configure, modify, or query one or more security profiles 138 stored in configuration database 130. Security profiles 136 may indicate roles and permissions corresponding to operators of database query devices 102 and/or database administrator devices 104 (e.g., identified by usernames). Security module 122 may query security profiles 136 to authorize certain actions by the operators of database query devices 102 and/or database administrator devices 104. For example, one of the operators of database query devices 102 and/or database administrator devices 104 may attempt to modify or add to the resource governance rules 132, attempt to modify the scrubbing and encryption scripts 134, access certain information within a dashboard, etc. Security module 122 may allow or deny these actions based upon permissions indicated in security profiles 136 that corresponds to the identified operator sending the respective request, such as an operator of database query devices 102 and/or database administrator devices 104, for example.

Compliance control module 124 may, when executed by host processor 114, determine whether data retrieved upon execution of a received SQL script is of a confidential and/or a sensitive nature. Examples of confidential or otherwise sensitive data that may be stored in data storage devices 106.1-106.N may include non-public information (NPI), payment card industry (PCI) data, financial data, medical underwriting data, social security numbers, drivers' license numbers, etc.

For example, compliance control module 124 may "scan" each of the collections of data 110.1-110.N based upon scrubbing and encryption scripts 134 to identify portions of each of collections of data 110.1-110.N that are or are not confidential or sensitive in some way. Scrubbing/encryption scripts 134 may include Structure Query Language (SQL) scripts or scripts in any other suitable programming language. In some cases, central data access server 108 may retrieve one or more of scrubbing and encryption scripts 134 for execution locally on host processor 114, and, in other cases, central data access server 108 may store at least some of the scrubbing and encryption scripts 134 in a suitable portion of memory 116 for quick subsequent retrieval.

Compliance control module 124 may, when executed by host processor 114, work in conjunction with security module 122. For example, when host processor executes an SQL script received via network interface 132, security module 122 may access security profiles 138 to determine whether a particular user of database query device 102 and/or database administrative devices 104 has full access to confidential and/or sensitive data, and if not, whether the user has access to a portion of the data. Based upon this determination, host processor 114 may execute instructions stored in compliance control module 124 to access scrubbing scripts 134 and "scrub" a portion of the data requested in accordance with the SQL script query such that portions of the queries data are not retrieved by a user that is unauthorized to view or otherwise access these portions.

To provide an illustrative example using a social security number as the sensitive data stored in data storage devices 106.1-106.N, compliance control module 124 may access an appropriate scrubbing script 134 associated with a corresponding insurer employee security profile accessed from security profiles 138. If the employee's associated security profile does not allow access to the entire social security number, then compliance control module 124 may utilize a scrubbing script 134 to mask all but the last 4 numbers, for example, of the social security number. In this way, compliance control module 124 may allow only a portion of the data requested via the SQL query script received via network interface 132 to be retrieved from data storage devices 106.1-106.N and sent to a requesting user.

To provide another example, users may desire to store confidential or sensitive data to one or more collections of data 110.1-110.N. In such a case, upon receiving an SQL script from a user indicating that confidential or sensitive data is to be stored, host processor 114 may execute instructions stored in compliance control module 124 to access encryption scripts 134. Upon accessing encryption scripts 134, host processor 114 may encrypt the data to be stored to one or more collections of data 110.1-110.N to protect the stored data.

Rules engine module 126 may, when executed by host processor 114, configure, modify, or query one or more resource governance rules 132 stored in configuration database 130. The resource governance rules 132 may include configuration information, settings, and/or parameters for one or more data access APIs. In various aspects, these data access APIs may be used to facilitate communications between central data access server 108 and other devices, such as database query devices 102, database administrator devices 104, and/or client devices 105, for example. Data access APIs may be utilized by rules engine module 126, when executed by host processor 114, to retrieve data in accordance with the API configuration information stored in resource governance rules 132.

In various aspects, central data access server 108 may govern processor-based resources in various ways using the data access API configuration parameters stored in resource governance rules 132. For example, the API configuration parameters may enable host processor 114 to determine whether a received SQL script is optimized, and to execute the SQL script only when the SQL script is optimized. Optimization of the SQL script may be based upon various factors that may be customized by a user (e.g., a database administrator) in accordance with the particular needs or characteristics of a company hosting the data stored in data storage devices 1016.1-106.N.

For example, SQL scripts may include a number of search parameters to use to retrieve data from data storage devices 106.1-106.N, which act as filters when applied to the data, returning only results that match the SQL script parameters. Some examples of SQL script parameters may include a region associated with the data such as a corresponding city, county, state, marketing region, etc. Some other examples of SQL script parameters may include policy types, coverage amounts, insurer names, addresses, policy numbers, or any other suitable parameter that may be used to search data stored in data storage devices 106.1-106.N.

As will be appreciated by those of ordinary skill in the relevant art(s), some SQL search parameters may result in a larger set of data being returned, thus utilizing more processing resources of host processor 114 while the SQL query script is being executed. For example, if a user requests data without specifying an appropriate region, then processor 114 may search data in storage devices 106.1-106.N over a very large default region, such as the entire country, for example. If this happens, then host processor 114 may utilize excessive resources to return a large amount of data, sacrificing resources that may otherwise be used to support customer-facing or other important applications. As a result of this excessive resource expenditure, the performance of these applications may suffer.

Therefore, aspects include resource governance rules 132 storing API configuration parameters such that SQL query scripts identified with excessive data retrieval are not executed. For example, the API configuration parameters may include instructions to only execute SQL query scripts at a specific regional level and lower (e.g., only state and lower), to only execute searches for a string of characters when a minimal number of characters are present, etc.

In some aspects, the determination of whether an SQL script is optimized or not may be made by host processor 114 via execution of rules engine module 126 and the API configuration parameters stored in resource governance rules 132, as previously discussed. In other aspects, however, this determination may be made by another user. For example, a user (e.g., a database administrator) of database administrator device 104 may oversee SQL scripts sent to central data access server from database query devices 102, approving only those scripts that are optimized or otherwise deemed to not overtax the resources of host processor 114, and otherwise rejecting the SQL scripts. In various aspects, users of database query devices 102 may be notified when a respective SQL script was rejected, a reason why it was rejected, or may simply not receive any retrieved data. In this way, an administrator may help to govern the resources of host processor 114 by acting as an arbiter of SQL query scripts sent to central data access server 108.

In various aspects, the processor resource limit threshold may be a maximum time period of execution of the SQL script. In some embodiments, the processor resource limit threshold may be a maximum number of host processor 114 machine cycles that have transpired during execution of the SQL script by host processor 114. As will be appreciated by those of ordinary skill in the relevant art(s), the transpired number of machine cycles translates into a certain time period based upon the clock frequency of host processor 114. Resource governance rules 132 may include a threshold number of machine cycles based upon a desired threshold "timeout" period, and once host processor 114 accumulates this number of threshold machine cycles, if the SQP script is still running, then host processor 114 may cease execution of the SQL script. In other embodiments, the processor resource limit threshold may be a time period, and if this time period has elapsed before execution of the SQL script has completed, then host processor 114 may cease execution of the SQL script.

In some aspects, the processor resource limit threshold may be a static, or predetermined, threshold. In other aspects, however, different processor resource limit thresholds may be utilized based upon various factors. For example, resource governance rules 132 may store several processor resource limit thresholds and a corresponding rule when each threshold should be used when host processor 114 is executing a SQL script. Rules engine module 126 may retrieve the appropriate processor resource limit threshold based upon a time of day when an SQL script is received and/or executed, a target data storage device 106.1-106.N to be searched when host processor 114 executes the SQL script, a number of data storage devices 106.1-106.N to be searched, etc.

To provide an illustrative example, central database access server 108 may have peak times associated with heavy usage of customer-facing applications. In other words, central database access server 108 may need to utilize more resources during peak times but fewer resources during off-peak times, such as overnight, for example. In an aspect, rules engine module 126, when executed by host processor 114, may access one processor resource limit threshold when an SQL script is received at a peak time, and another, different processor resource limit threshold when an SQL script is received at an off-peak time. In this way, resources of host processor 114 are governed to allow more processing time during off-peak time periods, and less processing time during peak time periods.

To provide another illustrative example, database 106.1 may store a larger amount of data than data storage device 106.2, or data storage device 106.1 may be physically located further from central access server 108 than data storage device 106.2. In either case, execution of a query SQL script by host processor 114 may take longer when searching and retrieving data from data storage device 106.1 as opposed to searching and retrieving data from data storage device 106.2. In an aspect, rules engine module 126, when executed by host processor 114, may access one processor resource limit threshold when execution the SQL script results in a search of data storage device 106.1, and another, different processor resource limit threshold when execution of the SQL script results in a search of data storage device 106.2. In this way, resources of host processor 114 are governed to allow more processing time when needed to search a larger set of data, and less processing time to search smaller sets of data.

In various aspects, host processor 114, upon execution of an SQL script, may store this SQL script in resource governance rules 132. As a result, over time, resource governance rules 132 may include a collection of optimized or otherwise approved SQL scripts. In accordance with such aspects, host processor rules engine module 126 may facilitate, upon execution by host processor 114, matching subsequently received SQL scripts to those stored in resource governance rules 132. As a result, host processor 114 may retrieve the data from the addresses corresponding to data storage devices 106.1-106.N that were associated with the previously retrieved data for the matched SQL script. In this way, once an SQL script and its corresponding data results are retrieved and their address locations stored, host processor 114 may retrieve data for a subsequently received SQL script without having to execute the SQL script. This advantageously allows host processor 114 to save processing resources that would otherwise be expended performing execution of a previously executed SQL script.

In various aspects, host processor 114 may execute instructions stored in rules engine module 126 to share saved (and thus optimized or otherwise approved) SQL scripts with other users. For example, host processor 114 may cause network interface 132 to send saved SQL scripts to database query devices 102, thus allowing operators of database query devices 102 to utilize these SQL scripts as needed instead of writing new SQL scripts from scratch.

Data management application module 128 may, when executed by host processor 114, provide host-based application services in accordance with a database management application framework. Although not shown in FIG. 1 for purposes of brevity, any suitable portion (or all) of data management application module 128 may be stored in configuration database 130 and/or data storage devices 106.1-106.N. Data management application module 128, when executed by host processor 114, may provide additional functionality in addition to SQL script execution.

For example, data management application module 128, when executed by host processor 114, may provide user interface APIs to present relevant user interface data, such as interactive display data, for example, to users sending SQL scripts to central data access server 108. To provide an illustrative example, host processor 114 may execute instructions stored in data management application module 128 to facilitate a graphical user interface being displayed at one or more of database query devices 102, database administrator devices 104, client devices 105, etc. This graphical user interface is discussed in further detail below with reference to FIGS. 2A and 2B.

To provide another example, data management application module 128 may include instructions, that when executed by host processor 114, facilitates a dashboard based upon gathered tracking information, which may function as an audit trail. The dashboard may include one or more interactive web pages, reports, portals, etc., allowing operators of database query devices 102 and/or database administrator devices 104 to view detailed reports about a history of SQL scripts, whether these scripts were executed or whether they ceased operation prior to execution, a user identifier associated with each received SQL script, a data storage device 106.1-106.N that was accessed for each of the plurality of SQL scripts that was executed, a time of day that each of the SQL scripts was received and/or executed, presently stored SQL scripts and their associated database addresses for data retrieved via their respective execution, a processor-based resource limit threshold for each of the plurality of SQL scripts that was ceased and thus not executed, etc. In various aspects, the audit trail tracking information may be stored in any suitable portion of memory 116, configuration data 130, and/or data storage devices 106.1-106.N.

Additionally or alternatively, the dashboard may allow the operators database query devices 102 and/or database administrator devices 104 to view any other suitable information regarding the overall operation of central data access server 108, such as information described in commonly assigned and co-pending U.S. patent application Ser. No. 14/483,553 and entitled "Automated Governance of Data Applications," which is hereby incorporated by reference in its entirety.

Because the dashboard may allow access to a large amount of information, a dashboard generated by data management application module 128 may be configured to be filtered by database query devices 102 and/or database administrator devices 104. That is, upon accessing a dashboard (e.g., via one or more web pages generated by the central data access server 108), operators of database query devices 102 and/or database administrator devices 104 may apply filters to the information available via the dashboard to view filtered dashboards. For example, certain operators may only wish to view executed SQL scripts for a particular one of the data collections 110.1-110.N and, as such, may filter the dashboard to display information regarding SQL script executions for only that particular data collection. To provide another example, another operator may only wish to view those SQL scripts that were ceased prior to their full execution, or SQL scripts executed within the last day, week, month, etc., and, as such, may filter the dashboard by these parameters. Generally, a dashboard generated by data management application module 128 may be filtered according to any suitable number of parameters.

In one aspect, a dashboard generated by data management application module 128 may include a health check portion to allow a user to view information related to the overall health and/or system status of computing environment 100. For example, a dashboard view may display one or more scores, graphs, plots, or other numerical or visual elements allowing the operators to quickly assess the health, performance, or adherence of resource governance, such as a history of processing resources used by central data access server 108, uptimes and downtimes of central data access server 108, a history of ceased SQL script executions, etc. In this manner, operators may easily and quickly understand the general health and performance of central data access server 108 and, if they wish, view more detailed tracking or reporting information via the dashboard. Again, the information displayed as part of the health check portion of the dashboard generated by data management application module 128 may be filtered according to any suitable number of parameters.

As will be appreciated by those of ordinary skill in the relevant art(s), data management application module 128 may be implemented to additionally perform any suitable number of tasks that are ordinarily performed in conjunction with a database management system. For example, data management application module 128 may be implemented to perform tasks such as data correction control, integrity rule management, quality rule management, business case validation rule management, etc.

Although FIG. 1 illustrates one central data access server 108 and one configuration database 130, aspects of computing environment 100 may implement any suitable number of servers and data storage devices. Furthermore, data access server may include any suitable number of host processors 114, network interfaces 132, and memories 116. For example, processing performed by central data access server 108 may be distributed among a plurality of servers in an arrangement known as "cloud computing," and the data stored in data storage devices 106.1-106.N and the configuration database 130 may be distributed among a plurality of data storage devices. As will be appreciated by those of ordinary skill in the relevant art(s), this configuration may provide several advantages, such as, for example, enabling near real-time uploads and downloads of information as well as periodic uploads and downloads of information.

II. Exemplary Graphical User Interface for Editing and Submitting an SQL Query Script FIG. 2A is an exemplary screenshot 200 of a graphical user interface (GUI) used to write an SQL script in accordance with one aspect of the disclosure. Example screenshot 200 includes portions 202, 204, and 206. In an aspect, screenshot 200 is an example of what may be displayed to a user as part of a graphical user interface used to generate and submit SQL scripts to central data access server 108.

As will be appreciated by those of ordinary skill in the relevant art(s), exemplary screenshot 200 is for illustrative purposes, and the described functions that it facilitates may be implemented using any suitable format and/or design without departing from the spirit and scope of the present disclosure. In various aspects, screenshot 200 may be part of a GUI implemented by a suitable display of one or more of database query devices 102 and/or database administrator devices 104. In an aspect, screenshot 200 may be generated by a suitable display via communications with a suitable host application executed by central data access server 108, such as via execution of data management application module 128 by host processor 114, for example.

Portion 202 may include any suitable graphic, information, label, prompt, etc., to indicate menu options. Portion 204 may include any suitable graphic, information, label, prompt, etc., to allow a user to create SQL query scripts. Portion 206 may include any suitable graphic, information, label, prompt, etc., to indicate navigation information.

In the example shown in FIG. 2A, screenshot 200 may include a menu option "all queries," which may be selected by a user to begin creating an SQL query script or to view previously generated and/or submitted SQL query scripts. As previously discussed with reference to FIG. 1, these previously submitted SQL query scripts may be stored by host processor 114 upon their receipt by central data access server 108 in locations such as configuration database 130, memory 116, and/or one or more of data storage devices 106.1-106.N, for example.

In one aspect, a user may toggle between the menu option "hide help" and "show help." In the example screenshot 200 shown in FIG. 2A, the user has selected the "show help" option, and thus the three labeled help boxes appear in portion 204 to help guide the user with applicable instructions. As indicated by these instructions, a user may filter the available query commands based upon that particular user's security profile; in this case the user is Mike Smith. A user may filter available query commands by selecting from a drop-down list of grouped queries, or a user may type a keyword as shown in portion 204 to filter queries by a portion of matched text.

In various aspects, portion 202 may include additional menu options, such as retrieving a list of results for previously submitted SQL query scripts ("my results") or submitting an SQL query script once selected and/or created by the user. Portion 202 may also include an option for administrators to add new SQL queries ("admin add query") to the list of available queries for a particular user. This may be useful, for example, if an employee's security profile is changed to allow the user access to additional queries that were previously unavailable.

Portion 206 may include various navigation labels to provide the user with information regarding the name of the currently generated and/or retrieved SQL script ("name of query"), a corresponding SQL ID ("SQL ID"), a status of the SQL script ("status"), and a description of the query that may be entered by a user to act as a label, or reference, for ease of SQL query identification. The status option, once selected by a user, may allow a user to see, for example, the status of a presently executed SQL script. Status information may include, for example, whether the SQL script has been approved or rejected by an administrator and/or by central data access server 108, whether the SQL script is being executed, whether the host processor 114 has ceased execution of the SQL, etc.

FIG. 2B is an exemplary screenshot 250 of a graphical interface used to edit and send an SQL script in accordance with one aspect of the disclosure. Example screenshot 250 includes portion 202 as previously discussed with reference to FIG. 2A, and also may include portions 252, 254, and 256. In one aspect, screenshot 250 may be displayed to a user upon a user selecting a query from portion 204 of screenshot 200, as previously discussed with reference to FIG. 2A. As will be appreciated by those of ordinary skill in the relevant art(s), example screenshot 250 is for illustrative purposes, and the described functions that it facilitates may be implemented using any suitable format and/or design without departing from the spirit and scope of the present disclosure.

Portion 252 may include any suitable graphic, information, label, prompt, etc., to allow a user to enter and/or edit SQL query scripts. Portion 254 may include any suitable graphic, information, label, prompt, etc., to indicate one or more parameters that may be used to create the SQL script entered in portion 252. Portion 256 may include any suitable graphic, information, label, prompt, etc., to allow a user to build and/or update SQL script queries.

Once a user has selected a desired SQL query script from a keyword search or a drop-down group list, as described with reference to FIG. 2A, a user may proceed to edit the SQL query script in portion 252. A user may enter and/or edit script text using a suitable input device (e.g., a keyboard) as shown in FIG. 2B. Additionally or alternatively, a user may utilize the SQL parameters in portion 254. In other words, a user may select the desired search parameters from portion 254 instead of manually typing these into portion 252. In an aspect, portion 254 acts as a graphical programming interface, allowing a user to select the desired SQL script parameters, which are in turn generated as part of the SQL script presented in portion 252.

Portion 254 may also require a user to select one or more parameters, which may subsequently be used upon execution of one or more respective SQL scripts for audit trail tracking purposes. As will be appreciated by those of ordinary skill in the relevant art(s), portion 254 may include any suitable number and type of SQL script parameters or other information that may be utilized to provide audit trail tracking.

Portion 256 may allow a user to build the SQL script entered in portion 252 ("build query,") and/or may allow an administrator to update previously generated queries and/or available SQL parameters displayed in portion 254 ("admin update query"). For example, an administrator may delete SQL scripts that are no longer in use and/or that are associated with a high number of failed (ceased) executions. To provide another example, an administrator may modify the available options presented to a user in portion 254 to meet database management needs, such as when additional data storage devices 106.1-106.N are added, new components are updated or installed, etc.

In some aspects, upon the SQL script being built, the SQL query script may be sent to central data access server 108 once the SQL script is approved by an administrator. In other embodiments, upon the SQL script being built, the SQL query script may be sent to central data access server 108 without being approved by an administrator, thus relying on host processor 114 to approve or reject received SQL scripts. The associated portions of screenshot 250 to save and/or send build SQL scripts are not shown in FIG. 2B for brevity.

III. An Example Database Recourse Governance Method

Figure 3:
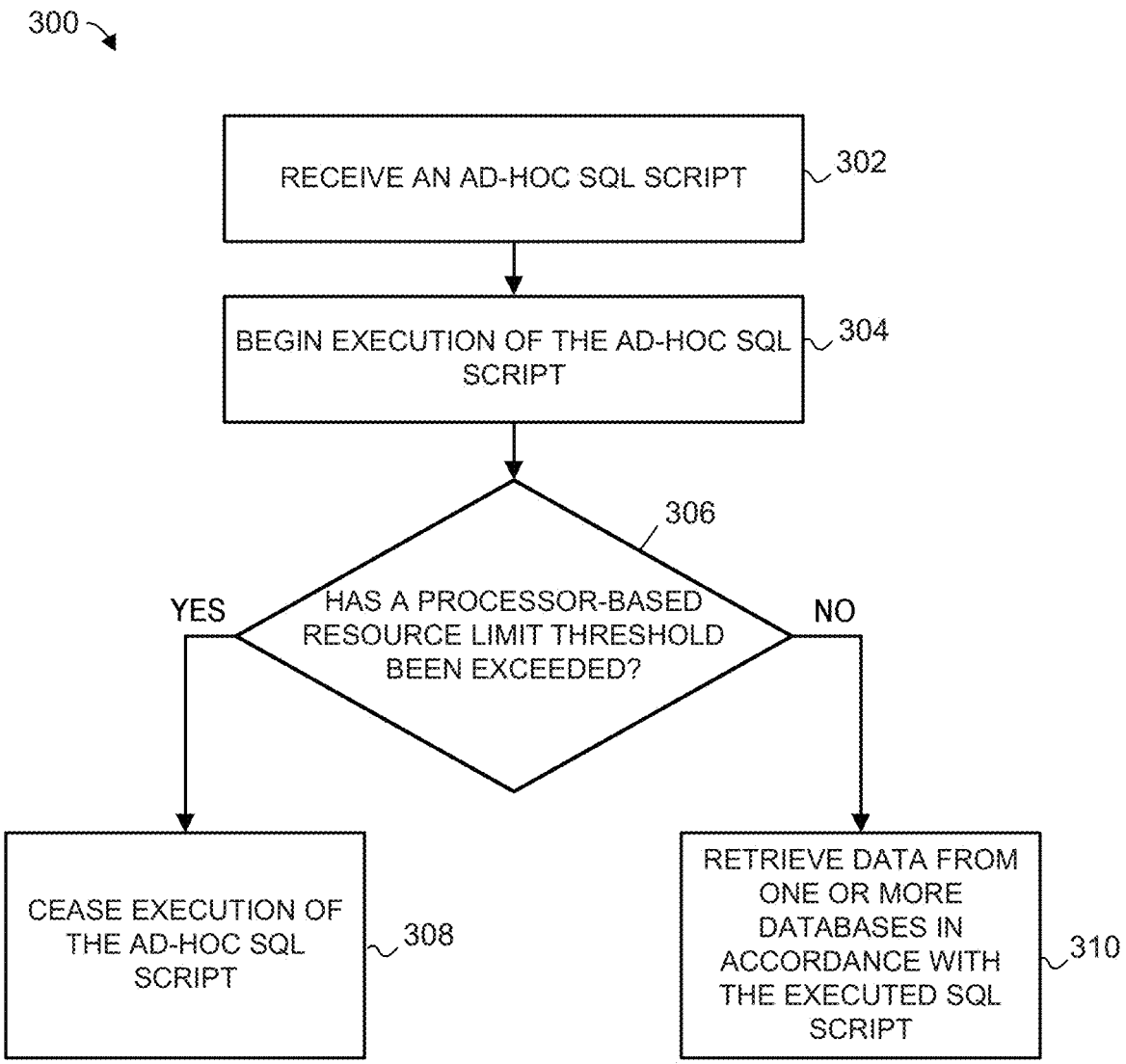
FIG. 3 is a flow diagram of an exemplary method 300 for retrieving data from one or more insurer databases.

FIG. 3 is a flow diagram of an example method 300 for retrieving data from one or more insurer databases in accordance with an exemplary aspect of the disclosure. In one aspect, method 300 may be performed by one or more processors, applications, and/or routines, such as host processor 114 of central data access server 108 executing one or more instructions stored in configuration module 118 and/or data management application module 128, for example, as shown in FIG. 1.

Method 300 may start when one or more processors may receive an ad-hoc SQL script (block 302). This ad-hoc SQL script may include, for example, an SQL script generated by a user of database query devices 102 and/or database administrator devices 104, for example. The user may generate the ad-hoc SQL script, for example, through the use of an input device in conjunction with a suitable user interface, such as an SQL script built by a user via portion 252, for example, as shown and described with reference to FIG. 2B. Method 300 may include host processor 114 receiving the ad-hoc SQL script via network interface 132, for example, as shown in FIG. 1 (block 302).

Method 300 may include one or more processors executing the ad-hoc SQL script to retrieve data from the one or more insurer databases (block 304). This may include, for example, host processor 114 starting execution of the ad-hoc SQL script received via network interface 132 to retrieve data from one or more data storage devices 106.1-106.N, for example, as shown in FIG. 1 (block 304).

Method 300 may include one or more processors determining whether a processor-based resource limit threshold is exceeded during execution of the ad-hoc SQL script (block 306). This may include, for example, host processor 114 determining whether a threshold number of clock transitions have occurred during execution of the ad-hoc SQL script (block 306). This may also include, for example, host processor 114 determining that a threshold time period has elapsed during execution of the ad-hoc SQL script (block 306).

Method 300 may include one or more processors ceasing execution of the ad-hoc SQL script upon the processor-based resource limit threshold being reached (block 308). This may include, for example, host processor 114 ceasing execution of an SQL script (block 308) upon a determination that the processor-based resource limit threshold has been exceeded (block 306).

Method 300 may include one or more processors retrieving data from the one or more insurer databases in accordance with the ad-hoc SQL script when the processor-based resource limit is not reached (block 310). This may include, for example, host processor 114 executing the ad-hoc SQL script received via network interface 132 (block 302) to retrieve data from one or more data storage devices 106.1-106.N (block 310) in accordance with the received ad-hoc SQL script. Method 300 may include additional, fewer, or alternate actions, including those discussed elsewhere herein.

Figure 4:
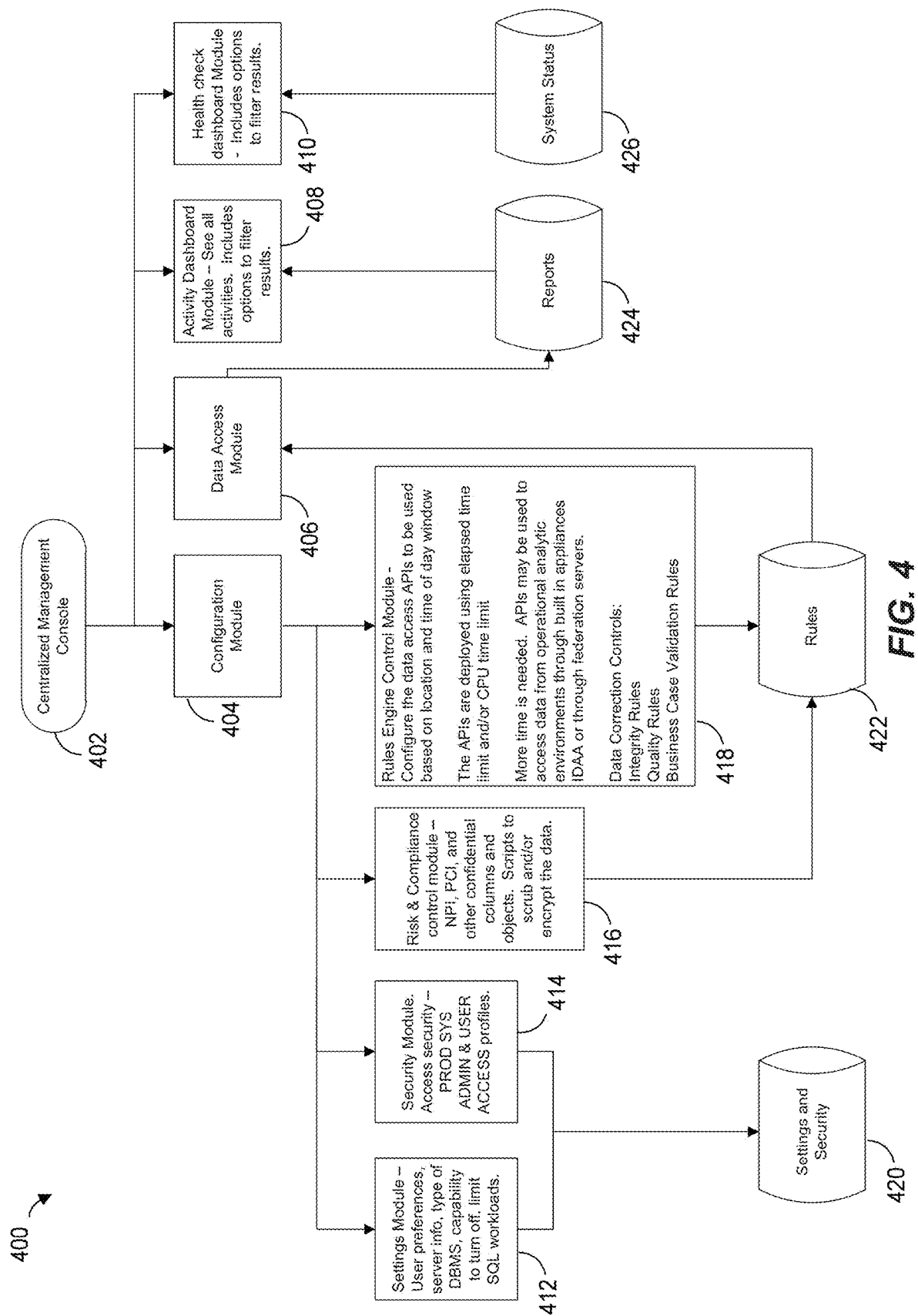
FIG. 4 is a flow diagram 400 for an exemplary computing environment for governing resources in conjunction with SQL script execution.

IV. Exemplary Flow Diagram for Retrieving Data from One or More Insurer Databases FIG. 4 is a flow diagram 400 for an example computing environment for governing resources in conjunction with SQL script execution in accordance with an exemplary aspect of the disclosure. Flow diagram 400 includes a centralized management console 402, a configuration module 404, data access module 406, an activity dashboard 408, and a health check dashboard 410. In an aspect, configuration module 404 may access and/or execute one or more additional modules, such as a settings module 412, a security module 414, a risk and compliance control module 416, and/or a rules engine control module 418, for example. In an aspect, the modules illustrated in flow diagram 400 may access one or more databases, such as settings and security database 420, rules database 422, reports database 424, and system status database 426, for example.

As shown in FIG. 4, flow diagram 400 illustrates a flow control corresponding SQL script execution and resource governance. In an aspect, flow diagram 400 illustrates flow control corresponding to a computing environment that implements resource governance, such as computing environment 100, for example, as shown in FIG. 1. As previously discussed with respect to FIG. 1, APIs may facilitate the flow shown in FIG. 4 between the various module and database elements. The functionality of these APIs is not repeated in reference to FIG. 4 for purposes of brevity.

In accordance with such an aspect, various elements illustrated in flow diagram 400 may be implemented as one or more elements as shown in computer environment 100. In an aspect, centralized management console 402 may be an implementation of central data access server 108. Furthermore, in an aspect, configuration module 404 may be an implementation of configuration module 118, while settings module 412, security module 414, risk and compliance control module 416, and rules engine control module 418 may be respective implementations of settings module 120, security module 122, compliance control module 124, and rules engine module 126. In addition, data access module 106, activity dashboard module 408, and health check dashboard module 410 may be implementations of one or more modules represented as data management application module 128.

Additionally, settings and security database 420 may be an implementation of data stored in settings profiles 136 and/or security profiles 138, while rules database 422 may be an implementation of data stored in resource governance rules 132 and/or scrubbing/encryption scripts 134. Furthermore, reports database 424 and system status database 426 may be an implementation of data stored in one or more data collections 106.1-106.N, as previously discussed with reference to FIG. 1 regarding the generation and viewing of reports and/or system status via a dashboard application.

As shown in FIG. 4, in an aspect, centralized management console 402 receives an SQL script from another device, such as a database query device 102, for example, as shown in FIG. 1. If the SQL script includes parameters requesting data, then the operational flow may proceed to configuration module 404, which executes the SQL script via one or more processors, such as host processor 114, for example, as shown in FIG. 1. The operational flow then proceeds to settings module 412, security module 414, risk and compliance control module 416, and/or rules engine control module 418, depending on the respective functions that are carried out with respect to the executed SQL script parameters.

For example, settings module 412 and security module 414 may be executed to access settings and security database 420. This may occur, for example, to identify a security profile associated with a user sending the SQL script, to access information requested by a user, and/or to determine the type of data that may be accessed by that user based on a corresponding security profile.

As shown in FIG. 4, several modules may be executed via configuration module 404 in parallel and/or concurrently. For example, rules database 422 may include one or more scrubbing and/or encryption scripts and may be accessed by risk and compliance control module 416 to execute an appropriate scrubbing and/or encryption script stored in rules database 422. Continuing this example, once an SQL script is received at centralized management console 402, configuration module 404 may execute settings module 412 and/or security module 414 to access settings and security database 420. Configuration module 404 may then execute risk and compliance control module 416 and/or rules engine control module 418 to access rules database 422. This may occur, for example, when sensitive data is requested by a user and the user's security profile is determined before executing the appropriate scrubbing script to scrub the data returned to the user.

Rules database 422 may include one or more API configuration information, settings, and/or parameters for one or more data access APIs, which may be accessed by rules engine control module 418 to facilitate resource governance of one or more processors (e.g., host processor 114) implemented to execute the received SQL script. For example, rules engine control module 418 may access rules database 422 to determine a processor-based resource limit threshold corresponding to a time of day when the SQL script was received, a location of the corresponding database that is accessed upon execution of the SQL script, the size of the database that is accessed upon execution of the SQL script, etc.

As shown in FIG. 4, the one or more API configuration information, settings, and/or parameters stored in rules database 422 may include information regarding instructions and/or actions to be taken by the one or more processors executing the SQL script if the processor-based resource limit threshold is exceeded. For example, as shown in FIG. 4, if more time is needed, API configuration information, settings, and/or parameters stored in rules database 422 may facilitate a processor offloading the SQL script execution to another device, such as via a DB2™ Analytics Accelerator (IDAA) or via a federation server control system.

In some aspects, data access module 406 may access the API configuration information, settings, and/or parameters stored in rules database 422 to retrieve data in accordance with an executed SQL script. This could include, for example, enabling a processor executing the SQL script to facilitate retrieving data when the SQL script is executed without the processor-based resource limit threshold being exceeded. To provide another example, data access module 406 may access rules database 422 to facilitate retrieving data corresponding to previously executed SQL scripts without the processor executing the received SQL script.

To provide yet another example, as shown by the operation flow illustrated in FIG. 4, data access module 406 may retrieve data and facilitate this data being stored in another database as opposed to being directly returned to the user via centralized management console 402. That is, as shown in FIG. 4, data access module 406 may retrieve data requested by a user via a dashboard application used in conjunction with activity dashboard module 408 and write this data to reports database 424 for subsequent access by the user via the dashboard application.

As shown in FIG. 4, the operational flow may include one or more of configuration module 404, data access module 406, activity dashboard module 408, and/or health check dashboard module 410 being executed in parallel and/or concurrently by centralized management console 402. For example, a first user may send an SQL script requesting data from centralized management console 402, while a second user may concurrently request a history of previously executed SQL scripts via an activity dashboard application. Furthermore, while the first and second users are sending their respective requests to centralized management console 402, a third user may concurrently request a system health check via the activity dashboard application.

In such a case, the operational flow shown in FIG. 4 illustrates concurrent execution of (1) configuration module 404 (and one or more modules executed by configuration module 404 based on the SQL script) and data access module 406 for the first user, (2) data access module 406 and activity dashboard module 408 for the second user, and (3) health check dashboard module 410 for the third user.

V. Exemplary Method of Retrieving Data from One or More Insurer Databases

In one aspect, a computer-implemented method for retrieving data from one or more insurer databases may be provided. The method may include (1) receiving, by one or more processors, an ad-hoc structured query language (SQL) script; (2) executing, by one or more processors, the ad-hoc SQL script to retrieve data from the one or more insurer databases; (3) determining, by one or more processors, whether a processor-based resource limit threshold is exceeded during execution of the ad-hoc SQL script; (4) ceasing, by one or more processors, execution of the ad-hoc SQL script upon the processor-based resource limit threshold being reached during execution of the ad-hoc SQL script; and/or (5) retrieving, by one or more processors, data from the one or more insurer databases in accordance with the ad-hoc SQL script when the processor-based resource limit is not reached. The method may include additional, fewer, or alternate actions, including those discussed elsewhere herein.

The method may include first determining whether the ad-hoc SQL script is optimized to retrieve data from the one or more insurer databases upon execution of the ad-hoc SQL script, and only executing the ad-hoc SQL script only when it is determined that the ad-hoc SQL script is optimized.

When the ad-hoc SQL script is used to retrieve confidential data, the method may include scrubbing a portion of the confidential data retrieved from the one or more databases such that the entirety of the confidential data is not retrieved. Additionally, the ad-hoc SQL script may be received via a public application programming interface (API). The method may be performed by a database server, and the one or more databases may be part of a federation server.

The processor-based resource limit threshold may be a maximum time period based upon a maximum number of machine cycles transpiring during execution of the ad-hoc SQL script. In such a case, the method may include determining whether the maximum time period has been exceeded based upon (1) a database from among the one or more databases that is accessed upon execution of the ad-hoc SQL script; and (2) a time of day when the ad-hoc SQL script is received.

The method may be performed for more than one received ad-hoc SQL script. For instance, a subsequent ad-hoc SQL script may be received after first receiving a plurality of ad-hoc SQL scripts. In such a case, the method may include retrieving data previously retrieved from the one or more databases corresponding to a previously executed ad-hoc SQL script without necessarily executing the subsequently received ad-hoc SQL script.

Additionally, when additional SQL scripts are received, the method may include storing an audit trail in one or more of the databases that includes one or more of (1) each of the plurality of ad-hoc SQL scripts; (2) data retrieved from the one or more databases for each of the plurality of ad-hoc SQL scripts that was executed; (3) the processor-based resource limit threshold for each of the plurality of ad-hoc SQL scripts that was ceased and thus not executed; (4) an identification of an employee from whom each of the plurality of ad-hoc SQL scripts was received; (5) a database from among the one or more databases that was accessed for each of the plurality of ad-hoc SQL scripts that was executed; and/or (6) a time of day that each of the plurality of ad-hoc SQL scripts was received.

VI. Exemplary Central Data Access Server

In one aspect, a central data access server is described for retrieving data from one or more insurer databases may be provided. The central data access server may include a network interface that is configured to receive an ad-hoc structured query language (SQL) script. The central data access server may also include one or more processors that are configured to (1) execute the ad-hoc SQL script to retrieve data from the one or more insurer databases; (2) determine whether a processor-based resource limit threshold is exceeded during execution of the ad-hoc SQL script; (3) cease execution of the ad-hoc SQL script upon the processor-based resource limit threshold being reached during execution of the ad-hoc SQL script; and/or (4) retrieve data from the one or more insurer databases in accordance with the ad-hoc SQL script when the processor-based resource limit is not reached. The central data access server may be configured for additional, less, or alternate functionality, including that discussed elsewhere herein.

For example, the one or more processors of the central data access server may first determine whether the ad-hoc SQL script is optimized to retrieve data from the one or more insurer databases upon execution of the ad-hoc SQL script, and only execute the ad-hoc SQL script when it is determined that the ad-hoc SQL script is optimized.

When the ad-hoc SQL script is used to retrieve confidential data, the one or more processors of the central data access server may scrub a portion of the confidential data retrieved from the one or more databases such that the entirety of the confidential data is not retrieved. Additionally, the ad-hoc SQL script may be received by the network interface of the central data access server via a public application programming interface (API). The central data access server may be a database server, and the one or more databases may be part of a federation server.

The processor-based resource limit threshold may be a maximum time period based upon a maximum number of machine cycles executed by the one or more processors of the central data access server transpiring during execution of the ad-hoc SQL script. In such a case, the one or more processors of the central data access server may determine whether the maximum time period has been exceeded based upon (1) a database from among the one or more databases that is accessed upon execution of the ad-hoc SQL script; and/or (2) a time when the ad-hoc SQL script is received.

The network interface of the central data access server may receive more than one ad-hoc SQL script. For instance, a subsequent ad-hoc SQL script may be received after first receiving a plurality of ad-hoc SQL scripts. In such a case, the one or more processors of the central data access server may be configured to retrieve data previously retrieved from the one or more databases corresponding to a previously executed ad-hoc SQL script without necessarily executing the subsequently received ad-hoc SQL script.

Additionally, when additional SQL scripts are received, the one or more processors of the central data access server may store an audit trail in one or more of the databases that includes one or more of (1) each of the plurality of ad-hoc SQL scripts; (2) data retrieved from the one or more databases for each of the plurality of ad-hoc SQL scripts that was executed; (3) the processor-based resource limit threshold for each of the plurality of ad-hoc SQL scripts that was ceased and thus not executed; (4) an identification of an employee from whom each of the plurality of ad-hoc SQL scripts was received; (5) a database from among the one or more databases that was accessed for each of the plurality of ad-hoc SQL scripts that was executed; and/or (6) a time that each of the plurality of ad-hoc SQL scripts was received.

VII. Exemplary Non-Transitory Computer Readable Medium

In one aspect, a non-transitory computer-readable medium storing machine readable instructions are described that, when executed by a processor, may cause the processor to: (1) receive an ad-hoc structured query language (SQL) script; (2) execute the ad-hoc SQL script to retrieve data from the one or more insurer databases; (3) determine whether a processor-based resource limit threshold is exceeded during execution of the ad-hoc SQL script; (4) cease execution of the ad-hoc SQL script upon the processor-based resource limit threshold being reached during execution of the ad-hoc SQL script; and/or (5) retrieve data from the one or more insurer databases in accordance with the ad-hoc SQL script when the processor-based resource limit is not reached. The non-transitory computer-readable medium may include additional, fewer, or alternate machine readable instructions, including those discussed elsewhere herein.

The instructions may cause the processor to first determine whether the ad-hoc SQL script is optimized to retrieve data from the one or more insurer databases upon execution of the ad-hoc SQL script, and to only execute the ad-hoc SQL script only when it is determined that the ad-hoc SQL script is optimized.

When the ad-hoc SQL script is used to retrieve confidential data, the instructions may cause the processor to scrub a portion of the confidential data retrieved from the one or more databases such that the entirety of the confidential data is not retrieved. Additionally, the ad-hoc SQL script may be received via a public application programming interface (API). The instructions may cause one or more acts to be executed by a processor that is part of a database server, and the one or more databases may be part of a federation server.

The processor-based resource limit threshold may be a maximum time period based upon a maximum number of machine cycles transpiring during execution of the ad-hoc SQL script. In such a case, the instructions may cause the processor to determine whether the maximum time period has been exceeded based upon (1) a database from among the one or more databases that is accessed upon execution of the ad-hoc SQL script; and/or (2) a time of day when the ad-hoc SQL script is received.

The instructions may cause the processor to perform one or more acts for more than one received ad-hoc SQL script. For instance, a subsequent ad-hoc SQL script may be received after first receiving a plurality of ad-hoc SQL scripts. In such a case, the instructions may cause the processor to retrieve data previously retrieved from the one or more databases corresponding to a previously executed ad-hoc SQL script without necessarily executing the subsequently received ad-hoc SQL script.

Additionally, when additional SQL scripts are received, the instructions may cause the processor to store an audit trail in one or more of the databases that includes one or more of (1) each of the plurality of ad-hoc SQL scripts; (2) data retrieved from the one or more databases for each of the plurality of ad-hoc SQL scripts that was executed; (3) the processor-based resource limit threshold for each of the plurality of ad-hoc SQL scripts that was ceased and thus not executed; (4) an identification of an employee from whom each of the plurality of ad-hoc SQL scripts was received; (5) a database from among the one or more databases that was accessed for each of the plurality of ad-hoc SQL scripts that was executed; and/or (6) a time that each of the plurality of ad-hoc SQL scripts was received.

VIII. Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm). In other aspects, however, the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some aspects may be described using the expression "coupled" and "connected" along with their derivatives. For example, some aspects may be described using the term "coupled" to indicate that two or more elements are in direct physical or electrical contact. The term "coupled," however, may also mean that two or more elements are not in direct contact with each other, but yet still co-operate or interact with each other. The aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the aspects herein. This is done merely for convenience and to give a general sense of the description. This description should be read to include one or at least one and the singular also includes the plural unless it is obvious that it is meant otherwise.

Although the forgoing text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Upon reading this disclosure, those of ordinary skill in the art will appreciate still additional alternative structural and functional designs for providing database application infrastructure management through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for retrieving data from one or more insurer databases, comprising:
  receiving, by one or more processors configured to both execute SQL scripts and execute one or more customer-facing applications, an ad-hoc structured query language (SQL) script from a database query device via a private local area network (LAN) not accessible by customers;
  allowing, by the one or more processors, customers to access the one or more customer-facing applications hosted by the one or more processors via a public network;
  executing, by the one or more processors, the ad-hoc SQL script received via the private LAN to retrieve data from the one or more insurer databases;
  determining, by the one or more processors, whether a processor-based resource limit threshold for executing the ad-hoc SQL script received via the private LAN is exceeded during execution of the ad-hoc SQL script received via the private LAN, wherein the processor-based resource limit threshold for executing the ad-hoc SQL script received via the private LAN is dynamically adjusted based upon usage of the one or more customer-facing applications hosted by the one or more processors via the public network and:
    a time of day when the ad-hoc SQL script is received via the private LAN,
    a time of day when the ad-hoc SQL script received via the private LAN is executed,
    a target data storage device to be searched upon execution of the SQL script received via the private LAN, and
    a number of data storage devices to be searched upon execution of the SQL script received via the private LAN;
  ceasing, by the one or more processors, execution of the ad-hoc SQL script received via the private LAN upon the processor-based resource limit threshold for executing the ad-hoc SQL script received via the private LAN being reached during execution of the ad-hoc SQL script received via the private LAN;
  retrieving, by the one or more processors, data from the one or more insurer databases in accordance with the ad-hoc SQL script received via the private LAN when the processor-based resource limit is not reached; and
  displaying, by the one or more processors, a graphical user interface configured to provide an audit trail associated with the ad-hoc SQL script received via the private LAN in response to an operator request.

2. The computer-implemented method of claim 1, further comprising:
  determining, by one or more processors, whether the ad-hoc SQL script is optimized to retrieve data from the one or more insurer databases upon execution of the ad-hoc SQL script, and
  wherein the act of executing the ad-hoc SQL script includes executing the ad-hoc SQL script only when it is determined that the ad-hoc SQL script is optimized.

3. The computer-implemented method of claim 1, wherein the processor-based resource limit threshold is a maximum time period based upon a maximum number of machine cycles transpiring during execution of the ad-hoc SQL script, and
  wherein the act of determining whether the maximum time period has been exceeded is based upon:
    a database from among the one or more databases that is accessed upon execution of the ad-hoc SQL script; and
    a time of day when the ad-hoc SQL script is received.

4. The computer-implemented method of claim 1, wherein the ad-hoc SQL script is from among a plurality of ad-hoc SQL scripts, and further comprising:
  storing, by one or more processors, an audit trail in one of the one or more databases including one or more of:
    each of the plurality of ad-hoc SQL scripts;
    data retrieved from the one or more databases for each of the plurality of ad-hoc SQL scripts that was executed;
    the processor-based resource limit threshold for each of the plurality of ad-hoc SQL scripts that was ceased and thus not executed;
    an identification of an employee from whom each of the plurality of ad-hoc SQL scripts was received;
    a database from among the one or more databases that was accessed for each of the plurality of ad-hoc SQL scripts that was executed; and
    a time that each of the plurality of ad-hoc SQL scripts was received.

5. The computer-implemented method of claim 4, further comprising:
  receiving, by one or more processors, an ad-hoc SQL script subsequent to receiving the plurality of ad-hoc SQL scripts; and
  retrieving, by one or more processors, data previously retrieved from the one or more databases corresponding to a previously executed ad-hoc SQL script without executing the subsequently received ad-hoc SQL script.

6. The computer-implemented method of claim 1, wherein the act of retrieving the data comprises:
  scrubbing, by one or more processors, a portion of data associated with a confidential status that is retrieved from the one or more databases such that the entirety of the confidential data is not retrieved.

7. The computer-implemented method of claim 1, wherein the act of receiving the ad-hoc SQL script comprises:
  receiving the ad-hoc SQL script via a public application programming interface (API).

8. The computer-implemented method of claim 1, wherein the acts of receiving the ad-hoc SQL script, executing the ad-hoc SQL script, determining whether the processor-based resource limit threshold is exceeded, retrieving data from the one or more databases in accordance with the ad-hoc SQL script, and ceasing execution of the ad-hoc SQL script are performed on a database server, and
  wherein the one or more databases are part of a federation server.

9. A central data access server for retrieving data from one or more insurer databases, comprising:
  a first network interface configured to receive an ad-hoc structured query language (SQL) script from a database query device via a private local area network (LAN) not accessible by customers;

a second network interface configured to allow customers to access one or more customer-facing applications hosted by the central data access server via a public network; and a processor configured to:

execute the ad-hoc SQL script to retrieve data from the one or more insurer databases;

execute the one or more customer-facing applications hosted by the processor via the public network;

determine whether a processor-based resource limit threshold for executing the ad-hoc SQL script received via the private LAN is exceeded during execution of the ad-hoc SQL script received via the private LAN, wherein the processor-based resource limit threshold for executing the ad-hoc SQL script received via the private LAN is dynamically adjusted based upon usage of the one or more customer-facing applications hosted by the processor via the public network and:

a time of day when the ad-hoc SQL script is received via the private LAN, a time of day when the ad-hoc SQL script received via the private LAN is executed, a target data storage device to be searched upon execution of the SQL script received via the private LAN, and a number of data storage devices to be searched upon execution of the SQL script received via the private LAN;

cease execution of the ad-hoc SQL script received via the private LAN upon the processor-based resource limit threshold for executing the ad-hoc SQL script received via the private LAN being reached during execution of the ad-hoc SQL script received via the private LAN;

retrieve data from the one or more insurer databases in accordance with the ad-hoc SQL script received via the private LAN when the processor-based resource limit is not reached; and display a graphical user interface configured to provide an audit trail associated with the ad-hoc SQL script received via the private LAN in response to an operator request.

10. The central data access server of claim 9, wherein the processor is further configured to determine whether the ad-hoc SQL script is optimized to retrieve data from the one or more insurer databases upon execution of the ad-hoc SQL script, and to execute the ad-hoc SQL script only when the ad-hoc SQL script is optimized.

11. The central data access server of claim 9, wherein the processor-based resource limit threshold is a maximum time period based upon a maximum number of machine cycles transpiring during execution of the ad-hoc SQL script, and wherein the processor is further configured to determine whether the maximum time period has been exceeded is based upon:

a database from among the one or more databases that is accessed upon execution of the ad-hoc SQL script; and a time of day when the ad-hoc SQL script is received.

12. The central data access server of claim 9, wherein the ad-hoc SQL script is from among a plurality of ad-hoc SQL scripts, and wherein the processor is further configured to store an audit trail in one of the one or more databases including one or more of:

each of the plurality of ad-hoc SQL scripts;

data retrieved from the one or more databases for each of the plurality of ad-hoc SQL scripts that was executed;

the processor-based resource limit threshold for each of the plurality of ad-hoc SQL scripts that was ceased and thus not executed;

an identification of an employee from whom each of the plurality of ad-hoc SQL scripts was received;

a database from among the one or more databases that was accessed for each of the plurality of ad-hoc SQL scripts that was executed; and a time that each of the plurality of ad-hoc SQL scripts was received.

13. The central data access server of claim 12, wherein the network interface is further configured to receive an ad-hoc SQL script subsequent to receiving the plurality of ad-hoc SQL scripts, and wherein the processor is further configured to retrieve data previously retrieved from the one or more databases corresponding to a previously executed ad-hoc SQL script without executing the subsequently received ad-hoc SQL script.

14. The central data access server of claim 9, wherein the processor is further configured to scrub a portion of data associated with a confidential status that is retrieved from the one or more databases such that the entirety of the confidential data is not retrieved.

15. The central data access server of claim 9, wherein the network interface is further configured to receive the ad-hoc SQL script via a public application programming interface (API).

16. The central data access server of claim 9, wherein the central data access server is a database server, and wherein the one or more databases are part of a federation server.

17. A non-transitory, tangible computer-readable medium storing machine readable instructions for retrieving data from one or more insurer databases, that, when executed by a processor, cause the processor to:

receive an ad-hoc structured query language (SQL) script from a database query device via a private local area network (LAN) not accessible by customers;

allow customers to access one or more customer-facing applications hosted by the processor via a public network;

execute the ad-hoc SQL script received via the private LAN to retrieve data from the one or more insurer databases;

execute the one or more customer-facing applications;

determine whether a processor-based resource limit threshold for executing the ad-hoc SQL script received via the private LAN is exceeded during execution of the ad-hoc SQL script received via the private LAN, wherein the processor-based resource limit threshold for executing the ad-hoc SQL script received via the private LAN is dynamically adjusted based upon usage of the one or more customer-facing applications hosted by the processor via the public network and:

a time of day when the ad-hoc SQL script is received via the private LAN, a time of day when the ad-hoc SQL script received via the private LAN is executed, a target data storage device to be searched upon execution of the SQL script, and
a number of data storage devices to be searched upon execution of the SQL script;
cease execution of the ad-hoc SQL script received via the private LAN upon the processor-based resource limit threshold for executing the ad-hoc SQL script received via the private LAN being reached during execution of the ad-hoc SQL script received via the private LAN;
retrieve data from the one or more insurer databases in accordance with the ad-hoc SQL script received via the private LAN when the processor-based resource limit is not reached; and
display a graphical user interface configured to provide an audit trail associated with the ad-hoc SQL script received via the private LAN in response to an operator request.

18. The non-transitory, tangible computer-readable medium of claim 17, further including instructions, that when executed by the processor, cause the processor to:
determine whether the ad-hoc SQL script is optimized to retrieve data from the one or more insurer databases upon execution of the ad-hoc SQL script and to execute the ad-hoc SQL script only when the ad-hoc SQL script is optimized.

19. The non-transitory, tangible computer-readable medium of claim 17, wherein the processor-based resource limit threshold is a maximum time period based upon a maximum number of machine cycles transpiring during execution of the ad-hoc SQL script, and
wherein the instructions to determine whether the maximum time period has been exceeded are based upon:
a database from among the one or more databases that is accessed upon execution of the ad-hoc SQL script; and
a time when the ad-hoc SQL script is received.

20. The non-transitory, tangible computer-readable medium of claim 17, wherein the ad-hoc SQL script is from among a plurality of ad-hoc SQL scripts, and further including instructions, that when executed by the processor, cause the processor to:
store an audit trail in one of the one or more databases including one or more of:
each of the plurality of ad-hoc SQL scripts;
data retrieved from the one or more databases for each of the plurality of ad-hoc SQL scripts that was executed;
the processor-based resource limit threshold for each of the plurality of ad-hoc SQL scripts that was ceased and thus not executed;
an identification of an employee from whom each of the plurality of ad-hoc SQL scripts was received;
a database from among the one or more databases that was accessed for each of the plurality of ad-hoc SQL scripts that was executed; and
a time of day that each of the plurality of ad-hoc SQL scripts was received.

21. The non-transitory, tangible computer-readable medium of claim 20, further including instructions, that when executed by the processor, cause the processor to:
receive an ad-hoc SQL script subsequent to receiving the plurality of ad-hoc SQL scripts; and
retrieve data previously retrieved from the one or more databases corresponding to a previously executed ad-hoc SQL script without executing the subsequently received ad-hoc SQL script.

22. The non-transitory, tangible computer-readable medium of claim 17, wherein the instructions to retrieve the data further include instructions, that when executed by the processor, cause the processor to:
scrub a portion of data associated with a confidential status that is retrieved from the one or more databases such that the entirety of the confidential data is not retrieved.

23. The non-transitory, tangible computer-readable medium of claim 17, wherein the instructions to receive the ad-hoc SQL script further include instructions, that when executed by the processor, cause the processor to:
receive the ad-hoc SQL script via a public application programming interface (API).

24. The non-transitory, tangible computer-readable medium of claim 17, wherein the instructions to receive the ad-hoc SQL script, execute the ad-hoc SQL script, determine whether the processor-based resource limit threshold is exceeded, retrieve data from the one or more databases in accordance with the ad-hoc SQL script, and cease execution of the ad-hoc SQL script are performed on a database server, and
wherein the one or more databases are part of a federation server.

* * * * *